United States Patent
Perez et al.

(10) Patent No.: US 9,813,555 B2
(45) Date of Patent: Nov. 7, 2017

(54) SPECTRAL DIAGNOSTIC ENGINE FOR CUSTOMER SUPPORT CALL CENTER

(71) Applicant: Xerox Corporation, Norwalk, CT (US)

(72) Inventors: Julien Perez, Grenoble (FR); Guillaume Bouchard, Saint-Martin-Le Vinoux (FR)

(73) Assignee: Conduent Business Services, LLC, Dallas, TX (US)

( * ) Notice: Subject to any disclaimer, the term of this patent is extended or adjusted under 35 U.S.C. 154(b) by 281 days.

(21) Appl. No.: 14/569,095

(22) Filed: Dec. 12, 2014

(65) Prior Publication Data

US 2016/0173690 A1    Jun. 16, 2016

(51) Int. Cl.

| | |
|---|---|
| *H04M 3/51* | (2006.01) |
| *G06Q 10/00* | (2012.01) |
| *G06Q 30/00* | (2012.01) |
| *G06F 17/16* | (2006.01) |
| *G06F 11/07* | (2006.01) |

(52) U.S. Cl.
CPC ......... *H04M 3/5175* (2013.01); *G06F 11/079* (2013.01); *G06F 11/0748* (2013.01); *G06F 17/16* (2013.01); *G06Q 10/20* (2013.01); *G06Q 30/01* (2013.01)

(58) Field of Classification Search
None
See application file for complete search history.

(56) References Cited

U.S. PATENT DOCUMENTS

| 8,724,795 B1* | 5/2014 | Aldrich | H04M 3/51 379/265.02 |
|---|---|---|---|
| 2002/0007237 A1* | 1/2002 | Phung | G05B 23/0216 701/31.4 |
| 2011/0161274 A1* | 6/2011 | Gao | G06F 17/30525 706/50 |

(Continued)

OTHER PUBLICATIONS

Gasic, et al., "Effective Handling of Dialogue State in the Hidden Information State POMDP-based Dialogue Manager," ACM Transaction on Speech and Lang. Proc. (TSLP) vol. 7 No. 3, pp. 1-28 (2011).

(Continued)

*Primary Examiner* — Creighton Smith
(74) *Attorney, Agent, or Firm* — Fay Sharpe LLP

(57) ABSTRACT

A collective matrix is constructed, having a diagnostic sessions dimension and a diagnostic state descriptors dimension. The diagnostic state descriptors dimension includes a plurality of symptom fields, a plurality of root cause fields, and a plurality of solution fields. Collective matrix factorization of the collective matrix is performed to generate a factored collective matrix comprising a sessions factor matrix embedding diagnostic sessions and a descriptors factor matrix embedding diagnostic state descriptors. An in-progress diagnostic session is embedded in the factored collective matrix. A symptom or solution is recommended for evaluation in the in-progress diagnostic session based on the embedding. The diagnostic state descriptors dimension may further include at least one information field storing a representation (for example, a bag-of-words representation) of a semantic description of a problem being diagnosed by the in-progress diagnostic session.

17 Claims, 2 Drawing Sheets

(56) References Cited

U.S. PATENT DOCUMENTS

2013/0294589 A1\* 11/2013 Bushey ................ G10L 15/197
  379/88.01
2016/0003711 A1\* 1/2016 Mawby ................ G01M 17/02
  73/146

OTHER PUBLICATIONS

Metallinou, et al., "Discriminative state tracking for spoken dialog system," ACL, vol. 1, pp. 466-475 (2013).

Thomson, et al., "Bayesian update of diaglogue state: A POMDP framework for spoken dialogue systems," Computer Speech & Language, vol. 24, No. 4, pp. 562-588.

Williams, et al., "Factored Partially Observable Markov Decision Processes for Dialogue Management," In 4th Workshop on Knowledge and Reasoning in Practical Dialog Systems, International Joint Conference on Artificial Intelligence (IJCAI) pp. 76-82 (2005).

Young, et al., "POMDP-based Statistical Spoken Dialogue Systems: a Review," Proc. IEEE, vol. 101, No. 5, pp. 1160-1179 (2013).

Williams, "Using Particle Filters to Track Dialogue State," Automatic Speech Recognition & Understanding, ASRU IEEE Workshop, pp. 502-507 (2007).

Williams, "Exploiting the ASR N-Best by tracking multiple dialog state hypothesis," Interspeech, pp. 191-194 (2008).

Williams, "Incremental Partition Recombination for Efficient Tracking of Multiple Dialog States," Acoustics Speech and Signal Processing (ICASSP) IEEE International Conference, pp. 5382-5385 (2010).

\* cited by examiner

SPECTRAL DIAGNOSTIC ENGINE FOR CUSTOMER SUPPORT CALL CENTER

BACKGROUND

The following relates to the diagnostic arts, call center support arts, and related arts.

A customer support call center is a known approach for providing customer support. Conventionally, the call center is staffed by call center personnel who answer telephone calls from customers seeking assistance in using a product or service supported by the call center. In some instances (i.e. "call sessions"), the call center staffer may be able to diagnose the problem over the telephone and offer the customer a solution that may be carried out by the customer or performed remotely by the call center staffer (for example, reconfiguring a computer, printer or other customer device remotely via the Internet). In other instances, the call center staffer may determine that the problem cannot be solved directly by the customer or by remote operations, and may accordingly dispatch a service person to the customer site—in this case, the call center staffer endeavors to obtain relevant information so as to ensure the service person is suitably equipped to handle the matter and has sufficient allocated time for the on-site service call. In a variant resolution, the call center staffer may instruct the customer to bring the device or other item needing service to a store or other location staffed by the vendor. Other variants exist, which are not exhaustively cataloged here: for example, in some instances the call center staffer may provide assistance to a new customer, for example diagnosing the needs of the new customer and recommending (and possibly ordering) an appropriate product or service to satisfy the new customer.

Call centers can be costly to maintain; yet a poorly functioning call center provides poor customer experience which can lead to lost business, both immediately and over time. Throughput is also important—even if the call center resolves the customer's problem, if there is a long delay before the call is handled (e.g. the customer is placed "on hold" for a long time), then the overall customer experience may be graded poor. Accordingly there is substantial interest in providing a call center with low cost, high efficiency, and performance. To maximize performance it would be beneficial to staff the call center with highly skilled experts; however, this may introduce unacceptable costs, and/or there may not be enough such experts to adequately staff the call center, thus leading to long delays. On the other hand, cost and (possibly) throughput can be reduced by staffing the call center with less well trained staffers, but this may lead to reduced performance.

An automated call center support system can be provided to "bridge the gap" by providing call center staff with automated diagnostic support. In the context of customer care, a diagnostic engine can provide prediction and/or decision functionality. In a prediction task, the diagnostic system predicts a solution to propose to the customer by integrating domain knowledge and contextual information. In a decision task, the diagnostic system predicts a "next question" that the call center staffer can ask the customer in order to elicit useful information. The amount of automation provided by a call center support system can vary. At one end, a call center staffer handles the customer interaction, and the diagnostic engine is accessed via a computer to provide a most probable predicted solution, or a probative question recommendation. At the other end, in a fully automated call center support system the human staffer is replaced by an artificial intelligence (AI) agent supported by the diagnostic engine.

The diagnostic engine is typically a rules-based inference engine that applies facts and rules (i.e. the "knowledge base") to predict a solution and/or recommend probative questions. A rules-based diagnostic engine is costly to design and maintain, as the set of rules needs to be initially generated (usually manually, constructed by expert design engineers or the like) and then kept up-to-date as the vendor's product (or service) line changes over time.

Diagnostic engines employing Bayesian or heuristic algorithms have also been contemplated. These approaches are less rigid than rule-based approaches, but still tend to follow a rigid sequence of symptom identification, root cause identification, and solution proposal, which can fail to fully leverage available information. Issues of rule maintenance when the number of rules is large can also arise.

Disclosed in the following are improved approaches.

BRIEF DESCRIPTION

In some embodiments disclosed herein, a diagnostic engine comprises an electronic data processing device programmed to perform a diagnostic support method including the operations of: constructing a collective matrix having a diagnostic sessions dimension and a diagnostic state descriptors dimension wherein the diagnostic state descriptors dimension includes at least a plurality of symptom fields corresponding to the symptoms of a symptoms set and a plurality of solution fields corresponding to the solutions of a solutions set; performing collective matrix factorization of the collective matrix to generate a factored collective matrix comprising a sessions factor matrix embedding diagnostic sessions and a descriptors factor matrix embedding diagnostic state descriptors; embedding an in-progress diagnostic session in the factored collective matrix; and determining one of a predicted solution for the in-progress diagnostic session and a not-yet-acquired probative symptom for the in-progress diagnostic session based on the embedding.

In some embodiments disclosed herein, a diagnostic call center comprises a diagnostic engine as set forth in the immediately preceding paragraph, and a call center device providing two-way communication between a customer and a call center agent to conduct the in-progress diagnostic session. The call center device further provides a user interface configured to display to the call center agent the predicted solution or not-yet-acquired probative symptom determined by the diagnostic engine for the in-progress diagnostic session being conducted via the call center device.

In some embodiments disclosed herein, a diagnostic method comprises: constructing a collective matrix $Y$ having a diagnostic sessions dimension and a diagnostic state descriptors dimension wherein the diagnostic state descriptors dimension includes at least a plurality of symptom fields corresponding to the symptoms of a symptoms set $\mathbb{S}$ and a plurality of solution fields corresponding to the solutions of a solutions set $\mathbb{L}$; performing collective matrix factorization of the collective matrix to generate a factored collective matrix comprising a sessions factor matrix $A$ embedding diagnostic sessions and a descriptors factor matrix $B$ embedding diagnostic state descriptors; embedding an in-progress diagnostic session in the factored collective matrix; and generating a recommended symptom or solution to evaluate for the in-progress diagnostic session based on the embedding. The constructing, performing, embedding, and generating operations are suitably performed by an electronic data processing device. In some embodiments the operation of performing collective matrix factorization comprises solving the minimization problem $$\min_{A,B}\{\|(Y-AB)W\| + \lambda_a\|A\| + \lambda_b\|B\|\}$$

where W denotes a weighting matrix, $\lambda_a$ and $\lambda_b$ are regularization parameters, and $\|\ldots\|$ denotes a matrix norm. In some such embodiments the matrix norm $\|\ldots\|$ is a $\|\ldots\|_2^2$ norm. The diagnostic state descriptors dimension may further include at least one information field storing a representation (for example, a bag-of-words representation) of a semantic description of a problem being diagnosed by the in-progress diagnostic session.

In some embodiments disclosed herein, a non-transitory storage medium storing instructions readable and executable by a computer to perform a diagnostic method comprising: performing collective matrix factorization of a collective matrix having a diagnostic sessions dimension and a diagnostic state descriptors dimension wherein the diagnostic state descriptors dimension includes at least a plurality of symptom fields corresponding to the symptoms of a symptoms set $\mathbb{S}$, a plurality of root cause fields corresponding to the root causes of a root causes set $\mathbb{C}$, and a plurality of solution fields corresponding to the solutions of a solutions set $\mathbb{L}$; and generating a recommended symptom or solution to evaluate for an in-progress diagnostic session using the factored collective matrix.

DETAILED DESCRIPTION

Figure 1:
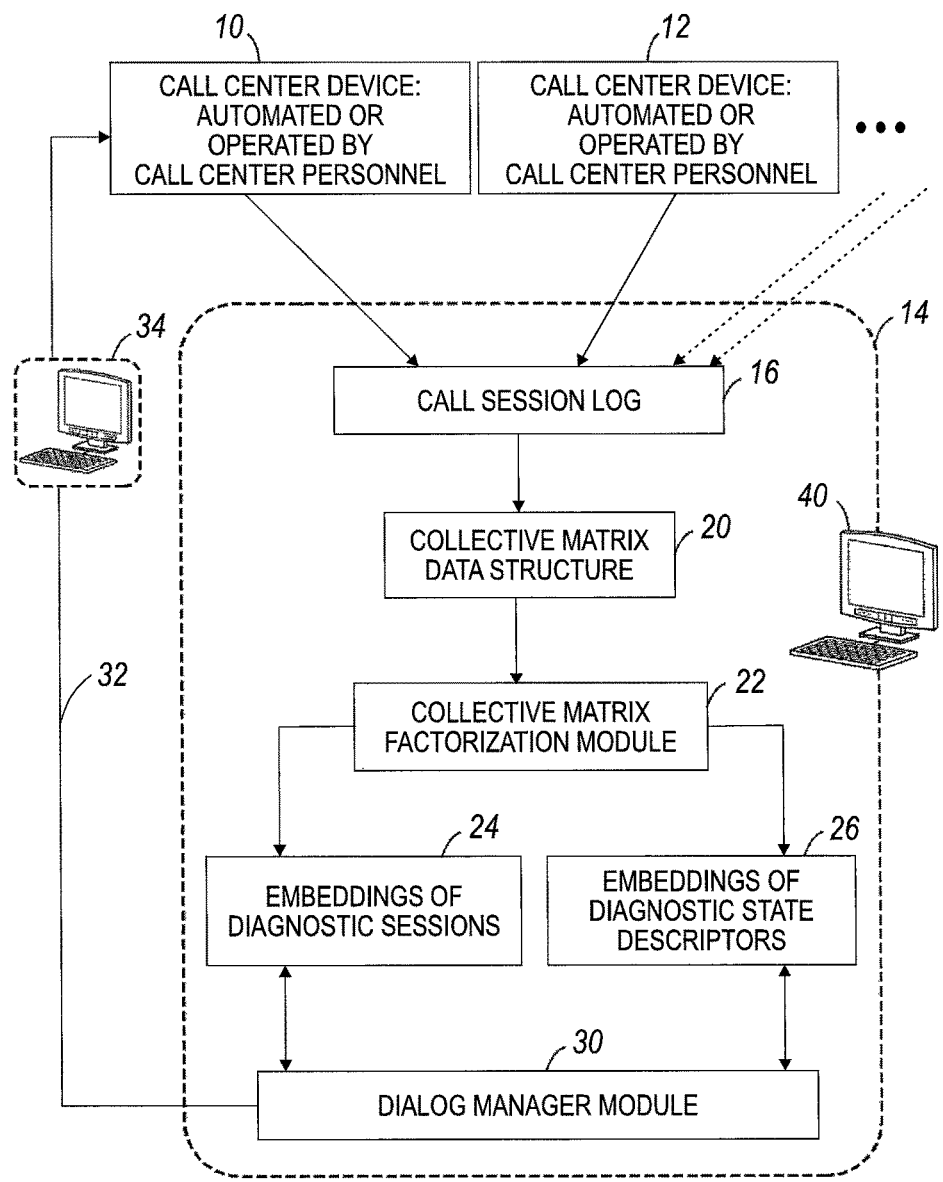
FIG. 1 diagrammatically shows a diagnostic call center including a call center support system.

Rules-based diagnostic engines are typically built upon large set of usually hand-crafted rules aiming at summarizing the overall possible situations the diagnostic system is intended to handle. Other diagnostic engine methodologies employ a stepwise machine learning approach including three steps: (1) Symptom identification; (2) Root Cause detection; and (3) Solution finding. Such diagnostic engines typically link these three steps through separate learning systems employing naïve Bayes classifiers or SVMs. In general, rules-based diagnostic engines suffer from a tendency for low recall and high precision behavior, are difficult to set up and maintain, and are generally unable to autonomously adapt to new context (for example, if the vendor comes out with a new or improved product, the corresponding rules need to be manually updated).

On the other hand, stepwise diagnostic systems employing Bayes inference or heuristic algorithms are typically unable to leverage interdependencies between the steps to expedite reaching a solution in a given diagnostic session. For example, in solving a customer problem, a solution may sometimes be identifiable based solely on confirmation of a sufficiently unique and probative symptom or set of symptoms, without having to perform the Root Causes detection step. As another example, a stepwise machine learning approach may present the customer with numerous symptom questions, many of which may be irrelevant to the ultimately proposed solution—but until the final solution step of the three-step process is reached, the solution is not delimited. On the other hand, the three steps diagnostic process is necessary in numerous cases in which ambiguities can appear between a set of symptoms and a set of different possible solutions—in these cases, the Root Cause detection step must be run to disambiguate the possible solutions.

The disclosed approaches implement the stepwise process of (1) symptom detection (2) root cause identification (3) solution discovery, but do so using a latent space representation in a space including at least a symptoms dimension, a root causes dimension, and a solutions dimension. The latent space may include additional dimensions, for example a dimension characterizing the customer problem description, and/or a dimension characterizing the device via which the customer care session is conducted. The space is populated by past care center sessions which serve as training data for learning a probabilistic model of (symptom, root cause, solution) triples. The elements of the triples belong to respective (typically large) sets of admissible symptoms $\mathbb{S}$, root causes $\mathbb{C}$ and solutions $\mathbb{L}$. Advantageously, the customer care agent (which may in general be a human care center staffer or an automated artificial intelligence expert system) is not required to go through the three identification steps in order to find the best solution to present to the customer—rather, the model trained in the latent space embodies interdependencies between symptoms, root causes, and solutions so that the care session is diagnosed holistically rather than sequentially.

With reference to FIG. 1, a diagnostic call center includes a plurality of call session devices 10, 12, and so forth, and a call center support system 14. The call center serves customers, where the term "customer" or similar nomenclature used herein is to be broadly construed as encompassing customers who have already purchased goods or services, potential customers, pro-bono clients, or so forth. The call center may be directly operated by the vendor of such goods or services, or may be operated by an agent of the vendor, or even by a party not associated with the vendor. While FIG. 1 diagrammatically shows two call session devices 10, 12, more generally the call center may have many such devices (although as few as a single call center device is also contemplated). Each call center device 10, 12 provides two-way communication between the customer and a call center agent via which the customer communicates the problem and answers various questions posed by the call center agent, and the call center agent poses said questions and conveys a proposed solution to the customer (at least in a successful call center session). It should be noted the term "solution" broadly encompasses total solutions, partial solutions, proposals for follow-up intended to lead to a solution (such as a proposed on-site visit by a vendor repair person or return of the product via mail for servicing), or other partial or total resolutions. The call center agent may, in general, be a human call center staffer or an autonomous artificial intelligence (AI) expert system. By way of illustration, a given call center device 10, 12 may include a telephone (or, equivalently, a computer running a voice-over-Internet protocol, VOIP, telephone session), or may include a two-way video conferencing station (comprising a computer with a microphone/speaker and a display screen wherein the computer runs video conferencing software enabling the call center agent to view and talk to the customer and vice versa), or may include a video-enhanced telephonic setup (for example, including a telephone and a computer via which the call center agent can view video of a device or other subject of interest at the customer end), or may include a setup comprising a telephone or VOIP connection and a computer running mirroring software to enable the call center agent to remotely operate the customer's computer (suitable for diagnosing computer problems), or so forth. In general, the call center devices 10, 12 may be different—for example, some call center agent may only be provided with a telephone while others may be provided with a video conferencing station. Call center agents conduct call sessions (e.g. "customer care sessions", "help calls", or so forth) in an effort to resolve customer problems. Usually a call session is initiated by the customer, although it is also contemplated for the call session to be initiated by the call center agent (for example, if the call center agent calls back a customer who left a message). Each call session is stored in a feedback log 16 in order to keep track of customer care sessions and customer care agent performance. In the illustrative embodiment, the call session log 16 is stored by the call center support system 14; in an alternative embodiment the log is separate from the support system but can be read by the support system. In the call session log 16, information such as the confirmed symptoms, identified root cause(s), and the successful solution(s) of each call session are stored after the call is processed by a call center agent.

Figure 2:
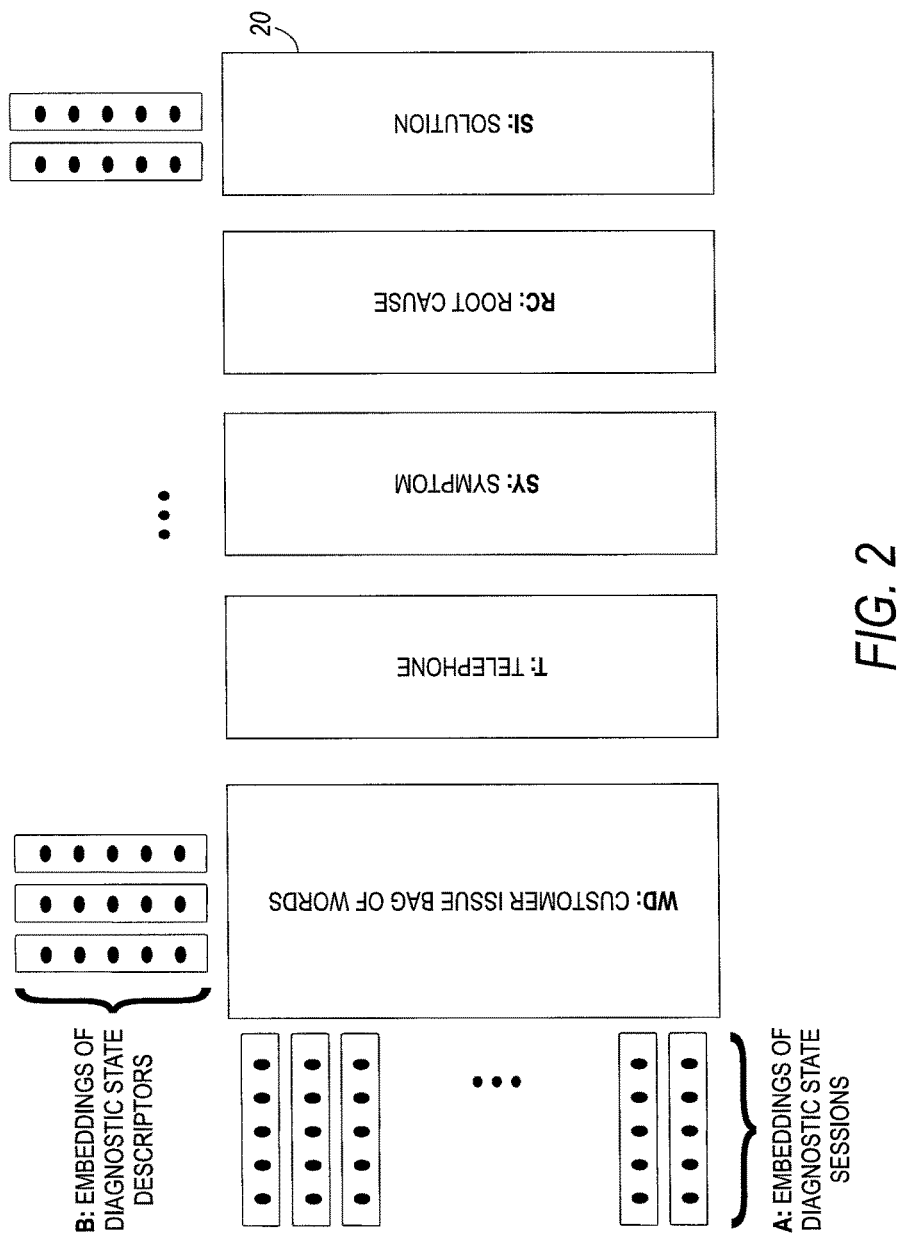
FIG. 2 diagrammatically shows the collective matrix data structure of the call center support system of FIG. 1.

In embodiments disclosed herein, the call center support system 14 implements a diagnostic engine that formulates relevant call session information for logged calls as a collective matrix data structure 20 (an illustrative example of which is diagrammatically shown in FIG. 2), and includes a collective matrix factorization module 22 that performs collective matrix factorization (the term "factorization" is also sometimes referred to by "spectral method", with similar motivation as related methods such as "spectral analysis", "spectral clustering", "spectral learning", or so forth) of the collective matrix 20 in order to generate factor matrices A and B, where the factor matrix A stores embeddings of diagnostic sessions 24 and the factor matrix B stores embeddings of diagnostic state descriptors 26. The collective matrix factorization module 22 can thus be viewed as performing a learning phase of the diagnostic process. A dialog manager module 30 then performs the inference phase in which the embeddings 24, 26 are used to predict a solution, and/or to propose a probative question to be posed to the customer by the care center agent. The dialog manager module 30 suitably operates by computing the information gain (IG) achieved by various candidate solutions or questions and choosing a candidate solution or question that provides a large (or largest) information gain. In illustrative FIG. 1, the state of the call center is that the call center device 10 is currently conducting a call session; accordingly, the proposed solution or question is conveyed via a communication pathway 32 from the dialog manager module 30 to the call center device 10.

In the case of a human staffer serving as the call center agent, the pathway 32 may, for example, suitably comprise displaying the proposed solution or question on a display device of the telephone, computer, or other user interface component of the call center device 10 wherein the display is viewable by the call center staffer but (typically) not by the customer.

On the other hand, in the case of an AI expert system 34 serving as the call center agent, the pathway 32 may suitably be a data transmission path via which the proposed solution or question is communicated to the AI expert system 34. By way of illustration, if the set of solutions $\mathbb{L}$ is stored in a column matrix (i.e. a vector), then the pathway 32 to the AI expert system may suitably comprise a transmission path via which an integer value which is the index of the proposed solution in the solutions matrix $\mathbb{L}$. The intervening AI expert system 34 is diagrammatically shown in FIG. 1 using a dashed border to indicate it is an optional component (typically omitted if a human staffer serves as the call center agent).

The call center support system 14 is embodied by a computer 40 or other electronic data processing device suitably programmed to implement the processing modules 22, 30 and suitable data storage medium or media for storing the log 16 and collective matrix data structure 20 and factor matrices 24, 26 (the data storage medium or media may be on-board the computer 40 as shown, or external to the computer but accessible by the computer, or some combination thereof such as having the collective matrix 20 and factor matrices 24, 26 stored on an internal hard drive or solid state drive, SSD, and the call session log 16 stored on a network RAID or other network-based storage). The AI expert system 34, if included, may be implemented on a computer separate from the computer 40 implementing the diagnostic engine 14 (as shown in FIG. 1), or the AI expert system and the diagnostic engine may be implemented on the same computer. In the latter case, the pathway 34 may be suitably implemented as a shared parameter, matrix, or the like that is shared between the AI expert system and diagnostic engine modules executing on the common computer.

It will be further appreciated that the disclosed diagnostic engine embodiments may be implemented as a non-transitory storage medium storing instructions readable and executable by the computer 40 to implement functionality of the processing modules 22, 30 and associated functions (e.g. reading the call session log 16, implementing the pathway 32 and optionally the expert system 34, or so forth). The non-transitory storage medium may, by way of illustrative example, include one or more of: a hard disk drive or other magnetic storage medium; an optical disk or other optical storage medium; a flash memory or other non-transitory electronic storage medium; or so forth.

Having provided an overview of the illustrative diagnostic engine as depicted in FIG. 1, some illustrative embodiments of the learning component 22 and the prediction component 30 are next described in additional detail.

Formally, a diagnostic session $d_i = \{s_i, c_i, l_i\} \in \mathbb{D}$ is composed with a set of features which are the symptoms $s_i \subset \mathbb{S}$, the root causes $c_i \subset \mathbb{C}$ and solutions $l_i \subset \mathbb{L}$. The formal objective of a diagnostic system is to estimate the probability of each solution $l_i$ given $s_i$ and $c_i$. This probability can be written as:

$$P(l_i | s_i, c_i) = \frac{P(l_i, s_i, c_i)}{P(s_i, c_i)} = \frac{P(d_i)}{P(s_i, c_i)} \qquad (1)$$

Following this approach, the marginal probability of a diagnostic session $d_i$ is estimated as a joint probability of it constituants $\{s_i, c_i, l_i\}$. This estimation is used to compute the information gain of new information $\phi$, that is, a given symptom or a given root cause, associated to a diagnostic session in order to choose the next best action to perform by the dialog manager, i.e which question to ask or information to confirm.

With continuing reference to FIG. 1 and with further reference to FIG. 2, the illustrative diagnostic engine is based on a joint probabilistic modelization of a call center session composed with the overall set of information composing a customer care dialog session: (1) a Bag of words of a summary of the client issue (2) Device Model (3) Symptom (4) Root cause (5) Solutions. FIG. 2 depicts one suitable format for the collective matrix data structure 20, in which the rows represent call sessions (i.e. diagnostic sessions) and the aforementioned information elements (1)-(5) are represented as successive contiguous column groups in the collective matrix. In the illustrative embodiment of FIG. 2, the Device Model is assumed to be a telephone model, but it will be understood that other embodiments of the call center devices 10, 12 as already described may be employed and suitably modeled in this column group of the collective matrix. While contiguous column groups are most convenient, the fields defined by the columns for each information category (1)-(5) could alternatively be arranged as interspersed columns. Other variations in the data storage structure are also contemplated, such as representing call sessions by columns and information fields by rows (i.e. transposing the illustrative collective matrix depicted in FIG. 2). It will be further appreciated that the detailed information (i.e. diagnostic state descriptors) can be different from those of the illustrative example of FIG. 2—for example, if the call center devices 10, 12 are all basically the same and do not have material differences from device to device, then the information category (2)—Device Model may optionally be omitted. In the illustrative embodiment the category (1)— summary of client dialog stores a bag-of-words representation of a semantic description of the problem being diagnosed by the in-progress diagnostic session in which the semantic description is represented by a vector of length V (where V is the vocabulary size) and each element stores a metric of the count of occurrences of a corresponding vocabulary word. (The metric may use various formats, such as a term frequency—inverse document frequency, TF-IDF, format). Such a bag-of-words summary may be generated, for example, by performing voice recognition on the customer's orally-provided problem description. In another approach, a human call center agent (staffer) may manually enter key words from the customer's problem description into a computer to generate the bag-of-words (in this case, V would typically be smaller, corresponding to relatively small set of key words). More generally, the information category (1) stores information about a problem being diagnosed by the in-progress diagnostic session, where the problem information is provided by the customer by one or more mechanisms, such as by answering an initial automated survey using touch tone phone buttons (e.g., posing basic questions such as "Please enter your device serial number using the keys of your telephone"; "If your problem relates to the device display, press '1' . . . if your problem relates to your network communication, press '2' . . . ").

The symptoms fields (Sy) store the symptom evaluation for each evaluated symptom. In some embodiments, a symptom field for a particular symptom stores a binary value, e.g. "0" indicates the symptom is not present while "1" indicates the symptom is not present. More complex symptom values are also contemplated, e.g. continuous values or so forth. Root cause (Rc) fields typically store binary values (the problem is due to a given root cause, or it is not). Solution (Sl) fields also typically store binary values (the problem is solved by a given solution, or it is not).

The diagnostic engine employs the model 24, 26 to estimate the distribution of probability of solutions of the set of solutions $\mathbb{S}$ with respect to a bag of words of a summary of the client issue, a set of confirmed symptoms and root causes. The dialog manager module 30 exploits such modelization in order to estimate the information gain $I(\phi)$ of a new information $\phi$ by computing the probability distribution of the solutions composing $\mathbb{S}$ given a set of symptoms and root causes {s, r} as follows:

$$I(\phi)=H(d\cup\phi)-H(d) \quad (2)$$

where $\phi \subset \{\mathbb{S}, \mathbb{C}, \mathbb{L}\}$ and $$H(d) = -\sum_{i=1}^{Card(\mathbb{S})+Card(\mathbb{C})+Card(\mathbb{L})} P(\phi_i)\log P(\phi_i) \quad (3)$$

The collective matrix factorization module 22 models the joint probability p(s, c, l) by collective factorization of the collective matrix 20. With illustrative reference again to FIG. 2, each row of the matrices corresponds to a successfully handled customer care session. All the sessions are aggregated in the collective matrix 20 to constitute a dataset. In the illustrative example of FIG. 2, $W_d$ is a vectorial representation of the summary of the customer problem written by the customer or by the care agent handling the diagnostic session. While a bag-of-words representation is used in the illustrative example, other representations may be used, such as a richer representation based on semantic parsing, formatted as a fixed-length vector. The fields under the device (e.g. telephone) category T is a sparse representation of the phone category involved during the customer care diagnostic session. The one or more contiguous fields $S_y$ contain a sparse encoding of the set of confirmed symptoms, and represent the symptoms that has been confirmed as valid through customer interaction with a call-center agent. The one or more contiguous fields $R_c$ contain a sparse representation of the root causes that has been detected as correct during the given customer call session. The one or more contiguous fields $S_l$ contain a sparse representation of the solutions that has been applied (successfully or not) to the customer care session. The optimization task associated to the collective factorization model is:

$$\min_{A,B} \|(Y - AB)W\|_2^2 + \lambda_a\|A\|_2^2 + \lambda_b\|B\|_2^2 \quad (4)$$

where $\{\lambda_a, \lambda_b\} \in \mathbb{R}^2$ are regularization parameters and W is a diagonal matrix that adjusts the weights of the solution variables in order bias the results toward better predictive accuracy on these specific variables. In some embodiments the weights W are used to incorporate or remove a particular parameter (symptom, root cause, or solution) from the analysis. For example, during training any symptom that has not been evaluated (i.e. whose value is not acquired) is assigned weight zero, so that it does not contribute to the collective matrix factorization. This approach can also be used to remove information if it is later determined to be invalid—for example, if the customer indicates a symptom is present so that its field is set to "1", but later determines the symptom evaluation was not reliable, it can be removed by setting the corresponding element of W to zero. It is also noted that, while the illustrative Expression (4) example employs a $\|\ldots\|_2^2$ matrix norm, more generally other matrix norms are contemplated, yielding the generalization $$\min_{A,B} \{\|(Y - AB)W\| + \lambda_a\|A\| + \lambda_b\|B\|\}$$

where $\|\ldots\|$ denotes a generic matrix norm. A suitable learning algorithm for evaluating Expression (4) is the alternating least squares algorithm which alternates between two convex optimization problems. First, for known factor matrix B (a descriptors factor matrix embedding diagnostic state descriptors), the factor matrix A is optimized as follows:

$$A^* = \operatorname{argmin}_A \|(Y - AB)W\|_2^2 + \lambda_a \|A\|_2^2 \quad (5)$$

Then, for a known matrix A, the factor matrix B is optimized as follows:

$$B^* = \operatorname{argmin}_B \|(Y - AB)W\|_2^2 + \lambda_b \|B\|_2^2 \quad (6)$$

By iteratively solving the two optimization problems of Expressions (5) and (6), the following fixed-point regularized and weighted alternating least square algorithms are obtained:

$$A \leftarrow (B^T W B + \lambda_a II)^{-1} B^T W T \quad (7)$$

and $$B \leftarrow (A^T A + \lambda_b II)^{-1} A^T Y \quad (8)$$

The weighting W matrix is only applied in Expression (7) for the updating of A, but not in Expression (8) for updating B, because only the columns of B, representing the features of each call session, have feature-specific weights. By contrast, for the optimization of the embeddings of factor matrix B, as per Expression (8), each call session embedding stored in the factor matrix A has the same weight, so in this second step of the algorithm, W is actually an identity matrix and so does not appear. (Diagnostic session-specific weights are also contemplated, however—for example, a session may be assigned a weight based on a customer satisfaction survey result for the session).

The prediction operation performed by the dialog manager module 30 performs the following operations: (1) finding the embedding of an in-progress call center session (i.e., in-progress diagnostic session) by solving the corresponding least square problem; and (2) estimating the missing values of interest, such as the probability of each solution of the solutions set $\mathbb{L}$ for the in-progress diagnostic session, by computing the cross-product between the embedding representing the in-progress diagnostic session computed in operation (1) and the corresponding column embeddings of the descriptors factor matrix B, of each solution. In a further operation (3), to find the most useful solution to recommend for evaluation, the information gain $I(\phi)$, in terms of solution distribution, is computed by adding a candidate symptom or root cause $\phi$ to the in-progress diagnostic session d. See Expressions (2) and (3) and related discussion. In similar fashion, a not-yet-acquired symptom may be recommended for evaluation based on which not-yet-acquired symptom of the symptoms set $\mathbb{S}$ provides the highest information gain. To perform the operation (2), Expression (5) can be decomposed into an expression for each row (that is, each session), and this decomposition for the added in-progress diagnostic session d is then evaluated, which reduces to computing a dot product. As modern GPU processing units are commonly designed to implement efficient dot product evaluation, the prediction process is readily performed in near-real time so that the call center agent (human staffer or AI expert system 34) receives the solution or symptom recommended for evaluation sufficiently quickly to relay to the customer via the two-way communication supported by the call center device 10 as part of the real-time dialog between the customer and call center agent.

If the customer performs the evaluation (that is, determines whether the symptom is present, or attempts the solution to see if it works), then the resulting information (the symptom value or the assessment of whether the solution solves the problem) is added to the in-progress call session embedding. If the call session ultimately results in identifying a successful solution, then the in-progress call session turns into a successful completed call session, and the corresponding embedding including the identification of the correct solution is stored as another row of the factored collective matrix Y 20, 24, 26. Occasionally, the factorization module 20 may be invoked to apply the optimization of Expression (4) to update the factor matrices 24, 26 to reflect the accumulated additional data embodied by these further successful call sessions. This update may optionally include culling out rows (i.e. call sessions) that are no longer of value for some reason (for example, because they pertain to products no longer being serviced) prior to the update optimization. Accordingly, the disclosed call center support system is adaptive and readily kept up-to-date so as to reflect the current product line and most up-to-date problem resolution pathways. (By comparison, updating a rules-based diagnostic engine requires tedious review/revision of the constituent rules).

While the illustrative embodiments described herein pertain to call center support, diagnostic engines disclosed herein will find more general application in diagnostic problems that conventionally follow a symptoms identification/root cause evaluation/solution recommendation approach. For example, many medical diagnoses follow this symptoms/root cause/solution processing sequence. In this application, the diagnostic engine may suitably execute on a physician's personal computer, or on a hospital network server accessed via the hospital data network.

In the following, some experimental results are reported in the field of customer care. More particularly, experimental diagnostic results are presented which were obtained on two real feedback datasets produced for two corporate customer care call centers. The results depicted are threefold. First, we present the capability of the model in terms of solution prediction. Second, we show how the model can be used in order to select the most discriminative next question to ask at a given step of a diagnostic process. Third, the overall diagnostic state elements are predicted with respect to $W_d$.

In the two customer care data set cases, the dataset was composed with a set of symptoms, root causes and solutions. The overall admissible set of symptom, root causes and solution is formally defined by a team of engineers knowledgeable in the area. A call center session comprises a subset of information identified through dialog, and each session has been identified as successful, i.e the chosen solution actually solved the customer problem that was the topic of the call center session. One dataset constituted a set of 12000 feedbacks, composed with 704 possible symptoms, 813 possible root-causes and 723 possible solutions. The other dataset constituted a set of 6850 feedbacks describes by 187 possibles symptoms, 249 root causes and 221 solutions.

Table 1 presents the 10-fold cross-validated results of the solution detection based on a collective matrix containing a bag-of-words of the call session, the symptoms, and the root causes. Because the model estimates the posterior probability of the solution with respect to the information of a session, it allows to detect the presence of the true solution in the n-most probable solutions estimated by the model. For this experiment, a Naive Bayes classifier was used as a baseline algorithm for comparison. In the tables of experimental results presented herein, the notation "CMF-N" denotes "collective matrix factorization" with N indicating the size of the embedding (that is, the rank of the factor matrix A), while the notation "P@M" denotes the fraction of sessions for which the correct solution was in the top-M solutions output by the algorithm.

TABLE 1

10-fold cross-validated error of solution prediction

| Dataset | Method | P@5 | P@10 | P@20 |
|---|---|---|---|---|
| #1 | CMF-100 | 0.71 ± 0.01 | 0.74 ± 0.01 | 0.78 ± 0.01 |
|  | CMF-200 | 0.76 ± 0.02 | 0.79 ± 0.01 | 0.82 ± 0.01 |
|  | CMF-500 | 0.85 ± 0.01 | 0.87 ± 0.01 | 0.89 ± 0.01 |
|  | CMF-1000 | 0.89 ± 0.001 | 0.91 ± 0.01 | 0.92 ± 0.01 |
|  | Naive Bayes | 0.586 ± 0.069 | 0.584 ± 0.112 | 0.642 ± 0.126 |
| #2 | CMF-100 | 0.855 ± 0.008 | 0.869 ± 0.009 | 0.902 ± 0.009 |
|  | CMF-200 | 0.886 ± 0.010 | 0.905 ± 0.006 | 0.919 ± 0.009 |
|  | CMF-500 | 0.779 ± 0.058 | 0.906 ± 0.012 | 0.928 ± 0.005 |
|  | CMF-1000 | 0.592 ± 0.110 | 0.826 ± 0.016 | 0.885 ± 0.012 |
|  | Naive Bayes | 0.699 ± 0.161 | 0.708 ± 0.234 | 0.802 ± 0.109 |

Next, two diagnostic capabilities are illustrated: (1) the ability of predicting the correct symptoms with respect to the bag of words of the client utterances; and (2) the ability to find the most relevant root causes with respect to the vectorial representation of the client uterrances and the confirmed symptoms. A Naive Bayes classifier was again used as the baseline method. The symptoms detection capability is illustrated in Table 2 and the root cause detection capability is illustrated in Table 3.

TABLE 2

10-fold cross-validated error of symptom prediction

| Dataset | Method | P@5 | P@10 | P@20 |
|---|---|---|---|---|
| #1 | CMF-100 | 0.687 ± 0.013 | 0.713 ± 0.018 | 0.762 ± 0.017 |
|  | CMF-200 | 0.744 ± 0.007 | 0.779 ± 0.008 | 0.800 ± 0.011 |
|  | CMF-500 | 0.773 ± 0.015 | 0.811 ± 0.008 | 0.827 ± 0.01 |
|  | CMF-1000 | 0.679 ± 0.001 | 0.752 ± 0.012 | 0.789 ± 0.013 |
|  | Naive Bayes | 0.577 ± 0.105 | 0.583 ± 0.118 | 0.620 ± 0.096 |
| #2 | CMF-100 | 0.750 ± 0.015 | 0.803 ± 0.019 | 0.815 ± 0.012 |
|  | CMF-200 | 0.791 ± 0.018 | 0.819 ± 0.009 | 0.858 ± 0.016 |
|  | CMF-500 | 0.852 ± 0.016 | 0.891 ± 0.017 | 0.912 ± 0.015 |
|  | CMF-1000 | 0.736 ± 0.020 | 0.799 ± 0.013 | 0.837 ± 0.014 |
|  | Naive Bayes | 0.866 ± 0.025 | 0.902 ± 0.019 | 0.916 ± 0.033 |

TABLE 3

10-fold cross-validated error of root cause prediction

| Dataset | Method | P@5 | P@10 | P@20 |
|---|---|---|---|---|
| #1 | CMF-100 | 0.655 ± 0.020 | 0.684 ± 0.005 | 0.728 ± 0.012 |
|  | CMF-200 | 0.707 ± 0.011 | 0.739 ± 0.011 | 0.789 ± 0.006 |
|  | CMF-500 | 0.788 ± 0.01 | 0.814 ± 0.01 | 0.835 ± 0.01 |
|  | CMF-1000 | 0.776 ± 0.012 | 0.831 ± 0.010 | 0.867 ± 0.010 |
|  | Naive Bayes | 0.514 ± 0.112 | 0.576 ± 0.155 | 0.614 ± 0.093 |
| #2 | CMF-100 | 0.725 ± 0.013 | 0.776 ± 0.019 | 0.811 ± 0.015 |
|  | CMF-200 | 0.751 ± 0.021 | 0.796 ± 0.013 | 0.825 ± 0.012 |
|  | CMF-500 | 0.675 ± 0.014 | 0.799 ± 0.012 | 0.849 ± 0.010 |
|  | CMF-1000 | 0.547 ± 0.03 | 0.627 ± 0.035 | 0.734 ± 0.026 |
|  | Naive Bayes | 0.712 ± 0.193 | 0.729 ± 0.250 | 0.786 ± 0.143 |

In a further experiment, the overall diagnostic steps were estimated using the bag-of-words representation of the semantic description of the problem being diagnosed. Here, the model estimates the probability distribution of: (1) the device model involved; (2) the symptom; (3) the root cause; and (4) the solution with respect to $W_d$. The experiment was performed on the dataset #1, and the cross-validated results are presented in Table 4.

TABLE 4

10-fold cross-validated error of the component-wise state prediction based on the bag-of-words semantic description representation

| Method | Variable | P@5 | P@10 | P@20 |
|---|---|---|---|---|
| CMF-100 | Phone | 0.773 ± 0.005 | 0.775 ± 0.008 | 0.778 ± 0.008 |
|  | Symptom | 0.635 ± 0.012 | 0.707 ± 0.011 | 0.769 ± 0.018 |
|  | Root cause | 0.541 ± 0.012 | 0.598 ± 0.014 | 0.639 ± 0.051 |
|  | Solution | 0.438 ± 0.010 | 0.535 ± 0.049 | 0.592 ± 0.050 |
| CMF-200 | Phone | 0.800 ± 0.006 | 0.803 ± 0.008 | 0.803 ± 0.008 |
|  | Symptom | 0.733 ± 0.007 | 0.820 ± 0.011 | 0.850 ± 0.011 |
|  | Root cause | 0.662 ± 0.092 | 0.704 ± 0.079 | 0.790 ± 0.092 |
|  | Solution | 0.704 ± 0.075 | 0.731 ± 0.082 | 0.765 ± 0.082 |
| CMF-500 | Phone | 0.691 ± 0.002 | 0.771 ± 0.003 | 0.778 ± 0.003 |
|  | Symptom | 0.650 ± 0.002 | 0.742 ± 0.013 | 0.779 ± 0.012 |
|  | Root cause | 0.538 ± 0.010 | 0.594 ± 0.003 | 0.616 ± 0.012 |
|  | Solution | 0.470 ± 0.014 | 0.584 ± 0.088 | 0.628 ± 0.008 |

In general, the disclosed diagnostic engines can forecast any element of the diagnostic process at any point during the in-progress customer care call dialog, including forcasting: (1) Device identity (2) Symptom (3) Problem root cause and (4) Solution. Furthermore, the call center agent (human or AI) enhanced with such diagnostic engine is able to efficiently handle the diagnostic part of the customer care inbound call by efficiently selecting the best next question, or action, to present to the customer. In consequence, the time spent until solution detection can be dramatically reduced by directly presenting the most probable solution at any point during a session instead of sequentially determining the different elements of the symptoms/root cause/ solution diagnostic process. A further advantageous aspect of the disclosed diagnostic engines is the ability to easily backtrack the state by suppressing any evidence previously validated during a session, for example by setting the corresponding weights of the weighting matrix W to zero. Both positive and negative confirmed facts expressed during the diagnostic process can be incorporated into the factored collective matrix model.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A diagnostic call center comprising:
a call session log comprising a data storage medium storing diagnostic sessions represented as at least symptoms belonging to a symptoms set and solutions belonging to a solutions set;
a diagnostic engine comprising an electronic data processing device programmed to perform a diagnostic support method including the operations of:
formulating the diagnostic sessions stored in the call session log as a collective matrix having a diagnostic sessions dimension and a diagnostic state descriptors dimension wherein the diagnostic state descriptors dimension includes at least a plurality of symptom fields corresponding to the symptoms of the symptoms set and a plurality of solution fields corresponding to the solutions of the solutions set;
performing collective matrix factorization of the collective matrix to generate a factored collective matrix comprising a sessions factor matrix embedding diagnostic sessions and a descriptors factor matrix embedding diagnostic state descriptors;
embedding an in-progress diagnostic session in the factored collective matrix;
determining one of a predicted solution for the in-progress diagnostic session and a not-yet-acquired probative symptom for the in-progress diagnostic session based on the embedding; and
in response to determining a not-yet-acquired probative symptom, displaying a recommendation to acquire the value of the probative symptom for the in-progress diagnostic session on a display device; and
a call center device providing two-way communication between a customer and a call center agent to conduct the in-progress diagnostic session, the call center device further providing a user interface configured to display to the call center agent the predicted solution or not-yet-acquired probative symptom determined by the diagnostic engine for the in-progress diagnostic session being conducted via the call center device.

2. The diagnostic call center of claim 1 wherein the diagnostic sessions are further represented as root causes belonging to a root causes set and wherein the diagnostic state descriptors dimension of the collective matrix further includes a plurality of root cause fields corresponding to the root causes of the root causes set.

3. The diagnostic call center of claim 1 wherein the diagnostic state descriptors dimension further includes at least one information field storing information about a problem being diagnosed by the in-progress diagnostic session.

4. The diagnostic call center of claim 3 wherein the at least one diagnostic session information field includes one or more fields storing a bag-of-words representation of a semantic description of the problem being diagnosed by the in-progress diagnostic session.

5. The diagnostic call center of claim 1 wherein the diagnostic support method includes the further operation of:
in response to determining a predicted solution for the in-progress diagnostic session, displaying the predicted solution for the in-progress diagnostic session on a display device.

6. A diagnostic call center comprising:
a call session log comprising a data storage medium storing diagnostic sessions represented as at least symptoms belonging to a symptoms set and solutions belonging to a solutions set;
a diagnostic engine comprising an electronic data processing device programmed to perform a diagnostic support method including the operations of:
formulating the diagnostic sessions stored in the call session log as a collective matrix Y having a diagnostic sessions dimension and a diagnostic state descriptors dimension wherein the diagnostic state descriptors dimension includes at least a plurality of symptom fields corresponding to the symptoms of the symptoms set and a plurality of solution fields corresponding to the solutions of the solutions set;
performing collective matrix factorization of the collective matrix to generate a factored collective matrix comprising a sessions factor matrix A embedding diagnostic sessions and a descriptors factor matrix B embedding diagnostic state descriptors, wherein the operation of performing collective matrix factorization comprises evaluating $$\min_{A,B}\{\|(Y-AB)W\| + \lambda_a\|A\| + \lambda_b\|B\|\}$$

where W denotes a diagonal weighting matrix, $\lambda_a$ and $\lambda_b$ are regularization parameters, and $\|\ldots\|$ denotes a matrix squared norm;
embedding an in-progress diagnostic session in the factored collective matrix; and
determining one of a predicted solution for the in-progress diagnostic session and a not-yet-acquired probative symptom for the in-progress diagnostic session based on the embedding; and
a call center device providing two-way communication between a customer and a call center agent to conduct the in-progress diagnostic session, the call center device further providing a user interface configured to display to the call center agent the predicted solution or not-yet-acquired probative symptom determined by the diagnostic engine for the in-progress diagnostic session being conducted via the call center device.

7. The diagnostic call center of claim 6 wherein the evaluating comprises:
performing an alternating least squares optimization in which the following are computed alternately:

$$A^* = \text{argmin}_A \|(Y - AB)W\| + \lambda_a \|A\|$$

and $$B^* = \text{argmin}_B \|(Y - AB)W\| + \lambda_b \|B\|.$$

8. The diagnostic call center of claim 1 wherein the determining operation comprises determining a predicted solution for the in-progress diagnostic session by:
determining the solution of the solutions set that maximizes information gain for the embedding.

9. A diagnostic call center comprising:
a call session log comprising a data storage medium storing diagnostic sessions represented as at least symptoms belonging to a symptoms set and solutions belonging to a solutions set;
a diagnostic engine comprising an electronic data processing device programmed to perform a diagnostic support method including the operations of:
formulating the diagnostic sessions stored in the call session log as a collective matrix having a diagnostic sessions dimension and a diagnostic state descriptors dimension wherein the diagnostic state descriptors dimension includes at least a plurality of symptom fields corresponding to the symptoms of the symptoms set and a plurality of solution fields corresponding to the solutions of the solutions set;
performing collective matrix factorization of the collective matrix to generate a factored collective matrix comprising a sessions factor matrix embedding diagnostic sessions and a descriptors factor matrix embedding diagnostic state descriptors;
embedding an in-progress diagnostic session in the factored collective matrix; and
determining a not-yet-acquired probative symptom for the in-progress diagnostic session by determining the not-yet-acquired symptom of the symptoms set that maximizes information gain for the embedding; and
a call center device providing two-way communication between a customer and a call center agent to conduct the in-progress diagnostic session, the call center device further providing a user interface configured to display to the call center agent the predicted solution or not-yet-acquired probative symptom determined by the diagnostic engine for the in-progress diagnostic session being conducted via the call center device.

10. A diagnostic method comprising:
storing diagnostic sessions represented as at least symptoms belonging to a symptoms set $\mathbb{S}$ and solutions belonging to a solutions set $\mathbb{L}$ in a call session log comprising a data storage medium;
formulating the diagnostic sessions stored in the call session log as a collective matrix Y having a diagnostic sessions dimension and a diagnostic state descriptors dimension wherein the diagnostic state descriptors dimension includes at least a plurality of symptom fields corresponding to the symptoms of the symptoms set $\mathbb{S}$ and a plurality of solution fields corresponding to the solutions of the solutions set $\mathbb{L}$;
performing collective matrix factorization of the collective matrix to generate a factored collective matrix comprising a sessions factor matrix A embedding diagnostic sessions and a descriptors factor matrix B embedding diagnostic state descriptors wherein the operation of performing collective matrix factorization comprises evaluating $$\min_{A,B}\{\|(Y - AB)W\| + \lambda_a\|A\| + \lambda_b\|B\|\}$$

where W denotes a weighting matrix, $\lambda_a$ and $\lambda_b$ are regularization parameters, and $\|\ldots\|$ denotes a squared matrix norm;
conducting an in-progress diagnostic session using a call center device for two-way communication between a call center staffer and a customer;
embedding the in-progress diagnostic session in the factored collective matrix; and
generating a recommended symptom or solution to evaluate for the in-progress diagnostic session based on the embedding; and
displaying the recommended symptom or solution to evaluate on the call center device to be viewed by a call center staffer;
wherein the constructing, performing, embedding, and generating operations are performed by an electronic data processing device.

11. The diagnostic method of claim 10 wherein the diagnostic sessions are further represented as root causes belonging to a root causes set $\mathbb{C}$ and wherein the diagnostic state descriptors dimension of the collective matrix Y further includes a plurality of root cause fields corresponding to the root causes of the root causes set $\mathbb{C}$.

12. The diagnostic method of claim 10 wherein the diagnostic state descriptors dimension further includes at least one information field storing a representation of a semantic description of a problem being diagnosed by the in-progress diagnostic session.

13. The diagnostic method of claim 10 wherein the evaluating comprises:
performing an alternating least squares optimization in which the following are computed alternately:

$$A^* = \text{argmin}_A \|(Y - AB)W\| + \lambda_a\|A\| \text{ and}$$
$$B^* = \text{argmin}_B \|(Y - AB)W\| + \lambda_b\|B\|$$

where $\|\ldots\|$ denotes a squared matrix norm.

14. The diagnostic method of claim 10 further wherein:
the two-way communication includes communicating the recommended symptom or solution from the call center staffer to the customer.

15. The diagnostic method of claim 10 wherein the generating comprises:
generating a recommended symptom as the symptom of the set of symptoms $\mathbb{S}$ that maximizes information gain of the embedding.

16. The diagnostic method of claim 10 wherein the generating comprises:
generating a recommended solution as the solution of the set of solutions $\mathbb{L}$ that maximizes information gain of the embedding.

17. The diagnostic call center of claim 1 wherein the call center device includes at least one of a telephone, a computer running a voice-over-Internet protocol (VOIP) telephone session; or a two-way video conferencing station comprising a computer with a microphone, a speaker, and a display screen.

* * * * *